T. MIDGLEY.
WHEEL TIRE.
APPLICATION FILED SEPT. 11, 1906.

1,067,361.

Patented July 15, 1913.

Witnesses
Thomas Midgley, Inventor
By his Attorney

UNITED STATES PATENT OFFICE.

THOMAS MIDGLEY, OF HARTFORD, CONNECTICUT, ASSIGNOR TO THE HARTFORD RUBBER WORKS COMPANY, A CORPORATION OF CONNECTICUT.

WHEEL-TIRE.

1,067,361.  Specification of Letters Patent.  Patented July 15, 1913.

Application filed September 11, 1906. Serial No. 334,105.

*To all whom it may concern:*

Be it known that I, THOMAS MIDGLEY, a citizen of the United States, residing in Hartford, Hartford county, Connecticut, have invented new and useful Improvements in Wheel-Tires, of which the following is a specification.

This invention relates to wheel tires and securing devices therefor, and it has special reference to solid tires of rubber or other resilient material, such as are used on carriages, trucks, and other road vehicles.

The principal object of the invention is to produce a certain amount of cushioning effect by the use of a minimum amount of rubber in the construction of a tire of any given width and at the same time to provide for the ready removal and application of the tire.

Other objects will appear as the invention is hereinafter described in detail in connection with the accompanying drawings, in which corresponding parts are designated by similar characters of reference in the several views.

The scope of the invention is clearly defined in the appended claims.

Figure 1:
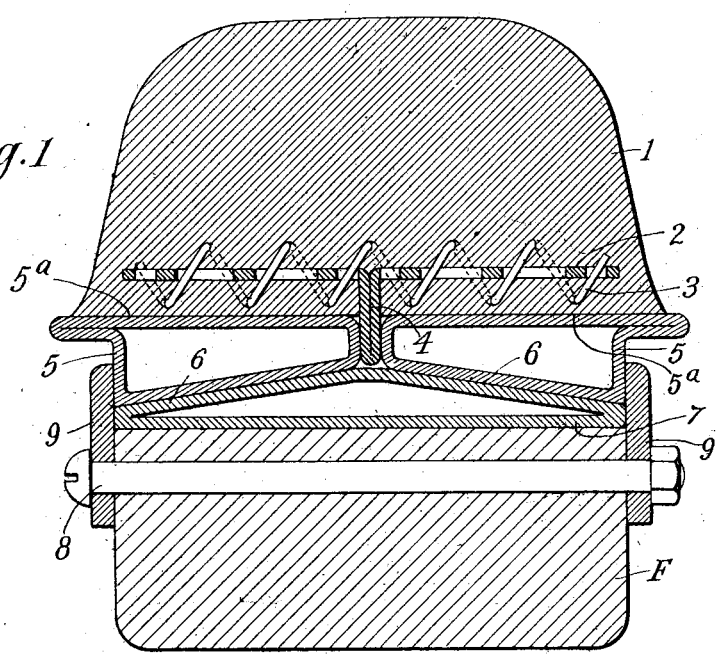
Figure 2:
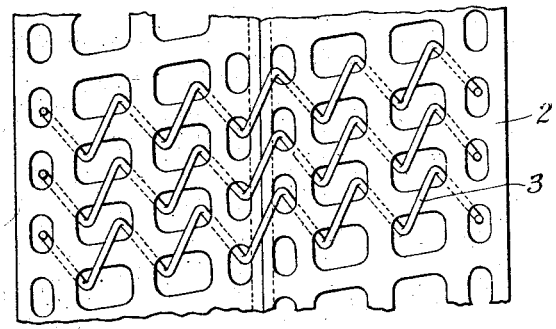
Figure 3:
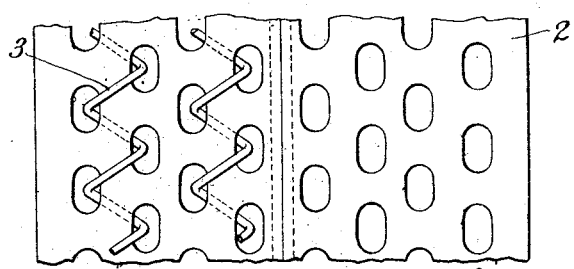

In the drawings: Figure 1 is a transverse sectional view through a felly, wheel rim and tire embodying the present invention. Fig. 2 is a detail plan view showing one arrangement of the base-plate and interlaced wires embedded in the tire. Fig. 3 is a detail plan view showing another arrangement of the base-plate and interlaced wires.

Practically all rubber tires for vehicle wheels as constructed hitherto have been secured upon the wheel rim by binding, clamping or bolting them in a channel. The channel in some instances has been made quite deep and in others comparatively shallow; but in every instance, so far as I am aware, the custom has been to seat the base of the tire in a channel of greater or less depth. This practice, which has been followed primarily to prevent lateral displacement of the tires, is objectionable because the resilience of that portion of the tire which is inclosed in the channel is useless in providing a cushion for the wheel. It is therefore desirable to mount the tire on a laterally uninclosed flat surface so that all the rubber or other resilient material of which the tire is composed may be made effective in producing a cushion for the wheel. It is also important that the tire be so constructed that there will be no possibility of lateral displacement and yet be readily removable from the wheel rim or applicable thereto when necessary. The desirable features of construction mentioned are embodied in the tire and rim construction illustrated in two slightly different forms in the accompanying drawings.

The tire comprises a body 1 of rubber or other suitable resilient material formed in an endless annulus and having molded in and incorporated with the base thereof an anchoring structure consisting of an endless band or plate 2 provided with a series of perforations and a plurality of wires or rods 3 secured in the apertures in the base-plate or band. The wires or rods 3 are preferably twisted into helices as shown, but they may be bent into irregular zigzag shape instead, the object being to present a reticular structure which the rubber of the tire body 1 will penetrate thoroughly and so obtain a secure hold thereon. The endless band or plate 2 is folded longitudinally on the median line to present an inwardly disposed rib or bead 4 which projects beyond the inner or wheel face of the tire and coöperates with a pair of wedging rings 5, which form a seat for the tire, in securing the tire against lateral displacement. The two wedging rings 5 are cut transversely at some point in their circumference so as to conform readily to the inclined outer surfaces 6 of the main rim member 7, which is shrunk on the felly F like an ordinary metallic tire or rim. The two wedging rings 5 present inclined faces for engagement with the correspondingly inclined surfaces 6 of the main rim member, but their outer or tire-seating surfaces 5ª are parallel to the axis of the wheel and are transversely flat, so that no channel is formed thereby to receive any portion of the rubber or other resilient material entering into the construction of the tire. When forced home on the wheel rim by means of the transverse bolts 8 and side rings or clamping plates 9, the adjacent edges of the wedging rings 5 contact with and grip firmly the bead 4 of the base-plate or band 2 which is embedded in the tire, thus absolutely preventing any lateral movement whatever of the tire upon its seat. In order to insure proper seating of the wedging rings on the rim, the base-plate or band 2 is placed sufficiently high in the body 1 of the tire to leave a considerable layer of the resilient material between the base-plate or band and the wheel face of the tire. This layer of cushioning material yields sufficiently to compensate for any such variation in the thickness of the wedging rings as is apt to occur as a result of the methods used in the manufacture of the wedging rings, which are preferably rolled into form.

The mode of applying a tire to the rim or removing it therefrom will be readily understood from an inspection of Fig. 1, from which it will be seen that the transverse bolts 8, one of the wedging rings 5, and one of the side rings or clamping plates 9 can be brought approximately into position before the application of the tire and the tire can be then slipped over the wheel and partially seated on the wedging ring which is approximately in position. The other wedging ring and side ring or clamping plate are then applied and the entire structure secured in position by tightening the transverse bolts. The removal of the tire is effected by first loosening the bolts, then removing one of the side rings or clamping plates and the adjacent wedging ring. After this the other side ring and wedging ring are loosened and the tire may be readily slipped off the wheel.

In Fig. 2 I have illustrated a convenient arrangement of the wires or rods 3 in the base-band or plate 2, the apertures through which the wires are laced being arranged on lines extending across the base-band or plate in a slightly oblique direction. The apertures in the band or plate 2 as illustrated in Fig. 3 are arranged for wires 3 extending circumferentially of the wheel, and other arrangements may be adopted if desired without departing from the invention.

Having thus described my invention, what I claim as new and desire to secure by Letters Patent is:

1. In a wheel, the combination with a rim and felly, of an external resilient non-expansible tire having an inner transverse cylindrical surface and an internally projecting anchoring rib or flange, wedging rim members having cylindrical surfaces corresponding to said cylindrical tire surface and situated between said felly and tire, and means situated externally of said members and felly for forcing said members inward and for holding the parts in position on the felly.

2. In a wheel, the combination with a rim and felly, of an external resilient tire having an inner transverse cylindrical surface, non-expanding reinforcing parts embedded therein, wedging rim members having cylindrical surfaces corresponding to said cylindrical tire surface and situated between said felly and tire, and side rings carried by the felly for holding said wedging members in position.

3. The combination with a tire of resilient material, of an anchoring structure embedded in the base thereof and comprising an endless plate or band presenting a rib or bead projecting inwardly beyond the wheel face of the tire and bent wires or rods forming a reticular structure permeated by the resilient material of the tire, and tire-securing devices mounted on the wheel and engaging said rib or bead.

4. The combination with a tire of resilient material having an inextensible anchoring structure embedded in the base thereof, of tire-securing devices mounted on the wheel and comprising a main rim member presenting oppositely inclined outer surfaces sloping inwardly toward their edges and wedging members presenting a transversely flat tire-seating surface and inclined wheel faces corresponding to the inclined surfaces of the main rim member, whereby said wedging members are expanded radially when forced together over the inclined outer surfaces of the main rim member.

In testimony whereof, I have signed my name in the presence of two witnesses.

THOMAS MIDGLEY.

Witnesses:
H. RICHARD WORSE,
GILBERT GANNON.